United States Patent [19]

Walker et al.

[11] 4,431,783

[45] Feb. 14, 1984

[54] VINYL CHLORIDE POLYMERIZATION IN REACTOR COATED WITH BUILD-UP SUPPRESSANT PRODUCT

[75] Inventors: Robert W. Walker, London; John Stuart-Webb, Welwyn Garden City, both of England

[73] Assignee: Imperial Chemical Industries PLC, London, England

[21] Appl. No.: 315,265

[22] Filed: Oct. 26, 1981

[30] Foreign Application Priority Data

Oct. 31, 1980 [GB] United Kingdom ................. 8035121

[51] Int. Cl.$^3$ .............................................. C08F 2/20
[52] U.S. Cl. ..................................... 526/62; 528/137; 528/147; 528/151; 528/153
[58] Field of Search .......................................... 526/62

[56] References Cited

U.S. PATENT DOCUMENTS 4,093,787  6/1978  Burgess ................................. 526/62

FOREIGN PATENT DOCUMENTS 54-107991  8/1979  Japan ..................................... 526/62

*Primary Examiner*—C. A. Henderson
*Attorney, Agent, or Firm*—Cushman, Darby & Cushman

[57] ABSTRACT

Polymerization of vinyl chloride in aqueous suspension using a polymerization reactor having adherently deposited on internal surfaces thereof a build-up suppressant coating comprising a product of build-up suppressant activity formable by (and preferably formed by) the condensation of an effective 1-naphthol (preferably 1-naphthol itself) and formaldehyde. The condensation is preferably effected in a base-catalyzed reaction; it may also (less preferably) be effected in an acid-catalyzed reaction. The coating product itself and a process for its production are also claimed.

10 Claims, No Drawings

VINYL CHLORIDE POLYMERIZATION IN REACTOR COATED WITH BUILD-UP SUPPRESSANT PRODUCT

The present invention relates to a process for the polymerisation of vinyl chloride in aqueous suspension in a reactor internally coated with a build-up suppressant coating, to a product having build-up suppressant activity, and to a process for the formation of this product.

When vinyl chloride is homo- or copolymerised in aqueous suspension in a reactor it is well known that a problem arises in that surfaces inside the polymerisation reactor become coated with tenaciously adhering polymeric material known as build-up. The formation of tenaciously adhering build-up is undesirable from the point of view of achieving efficient heat transfer for cooling and heating the reactor contents, effective usage of monomer, effective control and monitoring of the polymerisation reaction, and acceptable polymer quality (in view of contamination by dislodged particles of the build-up).

Because of the problems in respect of heat transfer, polymerisation control and polymer quality, it is necessary to clean the reactor between each polymerisation cycle wherein the deposited material is removed as completely as possible, e.g by scraping or chipping by hand, solvent cleaning or pressure-washing. This is wasteful in terms of the expense of the equipment and manpower required to carry out such cleaning and also in terms of the loss of productivity for a given reactor arising from the time taken to effect the cleaning operation. Hand cleaning is additionally undesirable in that it may constitute a health hazard to the cleaner in view of the harmful properties of vinyl chloride.

It has been proposed in British Pat. No. 1,439,339 to coat the internal surfaces of a reactor used for vinyl chloride polymerisation in aqueous suspension with, inter alia, a cross-linked product formed by reacting formaldehyde and a phenol (i.e. a hydroxy-substituted benzene) in order to prevent or reduce the formation of build-up therein. However, according to Japanese Patent Publication No. 54—107991, the coating product described in British Pat. No. 1,439,339 is not very effective in preventing build-up, apparently because the phenol/formaldehyde condensate is highly cross-linked.

In Japanese Patent Publication No. 54—107991 an improvement over the technique described in British Pat. No. 1,439,339 is proposed whereby the build-up suppressant applied to the reactor internal surfaces is an early-stage phenol/formaldehyde condensate. The preferred early-stage condensate is a resol, obtained using an alkaline catalyst, and conveniently applied as an alkaline aqueous solution. After applying the solution of the early-stage condensate, it is preferable to rinse the coated surface with water or with dilute acid (pH <6).

In our experience, however, the build-up suppressant systems comprising the condensate of a phenol and formaldehyde (such as described in Japanese Patent Publication 54—107991), while of undoubted utility, are not the ultimate in effectiveness and there is still room for further improvement. For example, we have found that the effective build-up suppression obtained with these phenol/formaldehyde condensates is not always reproducible when operating lengthy sequences of polymerisations, or is quite variable when used to prevent build-up in certain types of vinyl chloride copolymerisation, particularly vinyl chloride/vinyl acetate copolymerisation, or in old reactors whose internal surfaces are rough or blemished. Similar comments apply to other apparently promising known build-up suppressants that we have investigated.

We have now discovered a new build-up suppressant system which we have found to be significantly more effective than any build-up suppressant system that we have tested or employed in the past, including the resol-type condensates derived from a phenol and formaldehyde (as described for example in Japanese Patent Publication 54—107991).

According to the present invention there is provided a process for the polymerisation of vinyl chloride in aqueous suspension wherein the polymerisation is carried out in a polymerisation reactor having adherently deposited on internal surfaces thereof a build-up suppressant coating comprising a product having build-up suppressant activity formable by the condensation of an effective 1-naphthol and formaldehyde.

There is also provided according to the invention a product having build-up suppressant activity which product is formable by the condensation of an effective 1-naphthol and formaldehyde.

There is further provided according to the invention a process for the formation of a product having build-up suppressant activity which process comprises condensing an effective 1-naphthol and formaldehyde.

When using the condensation reaction between an effective 1-naphthol and formaldehyde for the preparation of a coating product according to the invention having build-up suppressant activity, the condensation is preferably effected in a base-catalysed reaction i.e. by condensing the an effective 1-naphthol and formaldehyde in the presence of a base. The condensation may also (although less preferably from a practical viewpoint) be effected in an acid-catalysed reaction i.e. by condensation in the presence of an acid. In both of these cases, the condensation is conveniently conducted in an aqueous medium (which is alkaline or acid as the case may be). While we are not entirely certain of the structure of the condensates, they are not considered to be resols or novolaks as these terms are conventionally applied to phenol/formaldehyde condensates prepared respectively by a base-catalysed reaction or an acid-catalysed reaction. Thus the spectral analysis by infra-red and nuclear magnetic resonance spectroscopy of the condensate prepared from 1-naphthol itself and formaldehyde under aqueous alkaline conditions, while complex and not capable of providing a definitive molecular structure, has indicated that the condensate contains no free methylol groups as would be expected if the product were a conventional early stage resol—although various types of methylene linkages are seen to be present (presumed to be attached to the 2 and 4 naphthalene nuclear positions, since 2 and 4 methylol groups are observed early on in the condensation, although these have disappeared in the final product). Moreover, molecular weight determination by ebulliometry indicates that only relatively small molecules containing up to three or four 1-naphthol-derived units, are present. Additionally, the 1-naphthol and formaldehyde appear to react together in substantially equimolar quantities to form the condensate (see later). Consequently, the absence of methylol groups, the result of the molecular weight determination, and the apparently equimolar reaction leads one to the conclusion that the product in this case is probably a mixture of cyclic trimers and tetramers in which 1-naphthol-derived units are linked by bridging methylene groups at the 2 and 4 nuclear positions. Also, the achievement of a very similarly effective product using an acid-catalysed condensation (which is thought to be the same as or very similar to the product from the base-catalysed reaction) additionally points to the build-up suppressant products of the invention being quite different in structure to conventional phenol/formaldehyde condensates.

Interestingly, the alkaline aqueous solutions (where preparable) of these condensates are highly coloured, often being deep blue, and it is thought that the deep colouration may be due to the presence of a small amount of a non-harmful (from the viewpoint of build-up suppressant activity) oxidation product.

The coating of the invention may be produced by first preparing an alkaline aqueous solution of the an effective 1-naphthol/formaldehyde condensate (if soluble in aqueous alkali), which will usually be the direct or diluted solution from the base-catalysed reaction in an aqueous medium to form the condensate (the basis catalyst being e.g. aqueous NaOH, aqueous KaOH, or aqueous NH₄OH and the alkaline aqueous solution that is formed from the condensation being separated, if necessary, from any small amount of precipitate that sometimes tends to be produced), optionally containing an added surfactant to promote the surface-covering facility of the condensate, applying this alkaline solution to internal surfaces of the reactor (e.g. by spraying, painting, or flooding) and allowing a coating of the condensate to form. The application of the solution in this way will of itself (i.e. without anything further needing to be done, such as drying or rinsing—although these steps can be employed if desired) cause a tenaciously adherent coating of the condensate to be formed on the reactor surfaces; optionally however the solution applied to the reactor may also contain other useful substances, e.g. an added protective colloid, such as partially hydrolysed polyvinyl acetate, (incorporated e.g. by further diluting the solution with an aqueous solution of the protective colloid) in order to yet further enchance the adhesion of the coating.

When aqueous NaOH or KOH is used as the basic catalyst for the base-catalysed condensation it is preferable to employ 0.70 to 0.90 moles of NaOH or KOH per mole of an effective 1-naphthol (although other ratios can of course be used) as in our experience this allows a particularly effective and clean conversion to the coating product of the invention.

Where the condensation has been produced by an acid-catalysed reaction (the acid catalyst being e.g. aqueous HCl) the alkaline aqueous solution will need to be produced by first isolating the product, and then dissolving it in aqueous alkali such as aqueous NaOH or KOH solution.

Where it is possible to do so, it is preferable that the coating product be applied to the reactor internal surfaces as an alkaline aqueous solution, e.g. dissolved in aqueous alkali such as aqueous NaOH or KOH solution as mentioned above. This is in fact possible for most of the coating products according to the invention which are usually soluble in aqueous alkali. However, where the coating product is insoluble in aqueous alkali, other means may be employed to effect the application of the coating product to the reactor internal surfaces; e.g. the product may be applied as a solution in an organic solvent—although this is not recommended for routine plant-scale operation due to the safety hazards that might be incurred.

It is to be understood that when the coating product is applied as a solution in aqueous alkali (as is preferred), it is a fair possibility that the product will be at least partly in the form of a salt, presumably a naphthate (assuming the naphtholic hydroxyl groups are still present) and the coating product of the invention embraces both neutral and corresponding salt versions of the constituent molecule(s).

By "an effective 1-naphthol" in this specification is meant a 1-naphthol which will condense with formaldehyde to form a coating product having build-up suppressant activity, i.e. a product that can be employed for the provision of an effective build-up suppressant coating. We have found that many 1-naphthols will condense with formaldehyde to yield products having build-up suppressant activity, although it has also been discovered that not all 1-naphthols will yield a product having such activity. The evidence to date indicates that an effective 1-naphthol is a 1-naphthol in which both of the 2 and 4 nuclear positions are unsubstituted and in which the 3 nuclear position is unsubstituted or has a substituent which is not strongly electron withdrawing. As an example of a strongly electron withdrawing group one may particularly mention—SO₂OH.

[N.B. the numbering employed in this specification in respect of the naphthalene nuclear positions is that recommended as definitive according to IUPAC rules, viz

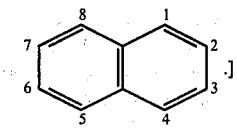
]

Preferably, the an effective 1-naphthol is selected from those of formula

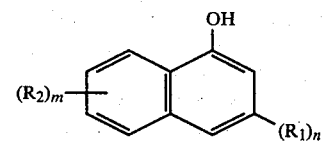

where n is 0 or 1; m is 0, 1, 2 or 3 (preferably 0, 1, or 2); R₁ and R₂ which may be the same or different are selected from halogen (preferably Cl), hydrocarbyl (preferably alkyl of 1–5 carbon atoms), hydroxyl, and hydrocarbyloxyl (preferably alkoxyl of 1–5 carbon atoms). (N.B. By n or m equal to 0 is meant that there is no substituent.)

Examples of effective 1-naphthols which may be used include 1-naphthol itself, 1,3-dihydroxy-naphthalene, 1,5-dihydroxy-naphthalene and 1,7-dihydroxy-naphthalene. All these 1-naphthols, when condensed with formaldehyde yield coating products having build-up suppressant activity according to the invention.

Most of the products of the invention (and particularly their alkaline aqueous solutions) may be stored for long periods without any significant deterioration in effectiveness provided precautions are taken to allow only a very limited access to oxygen; it is believed that an unlimited access to oxygen over a prolonged period allows the gradual build-up of harmful (from the viewpoint of build-up suppressant activity) oxidation prodfor the condensation of an effective 1-naphthol and formaldehyde in a molar ratio range of 1.1/1.0 to 1.0/1.2, particularly 1.05/1.0 to 1.0/1.1, is suitable for the production of a coating product according to the invention which will allow the formation of a coating combining excellent build-up suppressant activity with the facility of acceptably fast polymerisation in any vinyl chloride polymerisation recipe, i.e. even if the initiator employed is a dialkyl peroxydicarbonate. The most preferred molar admixture ratio is substantially 1.0/1.0.

The coating used in the process of the invention may be formed on any surface inside the reactor which is liable to suffer the formation of build-up thereon. For example, it may be formed on the interior surface of the main body of the reactor, and on the interior surface of the roof of the reactor which is often above the liquid level of the polymerisation medium and usually suffers tenacious build-up thereon. If a condenser is installed in a part of the reactor that is in contact with the gaseous phase during polymerisation or if it is installed outside the reactor and connected thereto by conduit piping, the condenser and conduit piping may be similarly coated.

The amount of the coating product to be employed is not too critical, although the coating should not be too heavy (to avoid any possibility of tainting the polymer) nor so light that effective build-up suppression is not achieved; obviously such limits will vary considerably according to various factors (e.g. the tendency of the polymerisation recipe to incur build-up formation to a lesser or greater extent—particularly in terms of the initiator employed, and the quality of the reactor surfaces). Generally speaking, it is normal to apply a volume of coating product solution (e.g. by spraying, painting or flooding—usually by spraying in large-scale operations) of appropriate concentration which volume is sufficient to evenly coat the reactor internal surfaces; this will of course vary according to the size of the reactor. We have usually found it convenient to apply a solution of low to moderate concentration (e.g. having a product concentration of, say, 3 to 25% w/v) to the reactor surfaces and to apply as little as possible concomitant with achieving acceptable surface coverage and an effective coating weight appropriate to the reactor/polymerisation recipe being employed; the efficiency of the application equipment (usually a spraying apparatus) will of course determine to some extent the minimum amount of solution that can be employed. (Also it is to be appreciated that the amount of coating product actually applied may be greater than that finally remaining on the reactor surfaces due to losses incurred through e.g. draining.)

By "polymerisation of vinyl chloride" is meant the homopolymerisation of vinyl chloride, the copolymerisation of vinyl chloride with one or more comonomers copolymerisable therewith, or the polymerisation of vinyl chloride in the presence of preformed polymers (optionally in the presence of grafting agents) to form graft-type vinyl chloride polymers. Examples of comonomers (copolymerisable with vinyl chloride) include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefines such as ethylene and propylene, vinyl ethers and styrene compounds. Examples of preformed polymers for forming graft-type vinyl chloride polymers include acrylic ester polymers such as poly-n-butyl acrylate, methyl methacrylate homo- and copolymers, poly-2-ethylhexyl acrylate, and olefine/vinyl ester copolymers such as ethylene/vinyl acetate copolymers. It is preferable to apply the invention to the production of polymers containing at least 50% molar and more particularly at least 80% molar, of units derived from vinyl chloride.

The process of the invention is particularly useful when applied to the production of vinyl chloride/vinyl acetate copolymers containing 3–20% molar of vinyl acetate units, since it is in any case often extremely difficult when using known build-up suppressants to obtain a consistently build-up free process for making such copolymers.

Any suitable suspension agent may be used for polymerisation in aqueous suspension according to the invention, and particularly polyvinyl acetates of various degrees of hydrolysis and water-soluble cellulosic esters. These suspension agents can be used together with secondary suspension agents if desired. The amount employed may vary widely and is generally between 0.05 and 1.5% by weight calculated on vinyl chloride used.

Any suitable free-radical polymerisation initiator that is monomer-soluble may be used for polymerisation in aqueous suspension. Examples of these include peroxy compounds such as di-tertiarybutyl peroxide, lauroyl peroxide and acetyl cyclohexyl, sulphonyl peroxide, azo compounds such as azo-bis-isobutyronitrile and 2,2'-azo-bis-2,4-dimethylvaleronitrile. Monomer-soluble free-radical polymerisation initiators that are particularly suitable for use in a polymerisation process according to the invention are the dialkyl peroxydicarbonates (the term "alkyl" including "cycloalkyl") whose alkyl radicals contain up to 20 carbon atoms, such as diethyl peroxydicarbonate, di-isopropyl peroxydicarbonate, dicetyl peroxydicarbonate, and bis (4-tertiarybutylcyclohexyl) peroxydicarbonate, and azo compounds such as 2,2'-azo-bis-2,4-dimethylvaleronitrile and azo-bis-isobutyronitrile. These initiators may be used in conventional quantities—generally speaking from 0.01 to 1% by weight calculated on vinyl chloride.

The operating conditions for polymerisation according to the present invention may be those customarily used for vinyl chloride polymerisation. For example, the polymerisation temperature is generally in the range 40° to 80° C. and the pressure generally below 20 kg/cm$^2$.

The present invention is now illustrated by the following Examples. Unless otherwise specified all parts and percentages are by weight. In all Examples employing a polymerisation in a reactor, unless otherwise specified, the reactor internal surfaces were cleaned thoroughly before use.

EXAMPLE 1

Coating products according to the invention, for use in the preparation of build-up suppressant coatings according to the invention, were prepared (on various scales) from 1-naphthol and formaldehyde in base-catalysed reaction using the following generalised recipe.

1-Naphthol ($\times$ mole) and NaOH (between $0.7 \times$ and $0.8 \times$ mole, normally $0.72 \times$ mole) as a 1 molar aqueous solution were charged to a reaction vessel and heated to 70° C. Formaldehyde (y moles, y usually being equal to x) as a 38% w/v aqueous solution was added dropwise with stirring during which the rate of addition was ucts, usually manifested by substantial precipitation in the alkaline aqueous solution.

As an example of an ineffective 1-naphthol, i.e. one which will not (with formaldehyde) yield a coating product having build-up suppressant activity according to the invention, there may be mentioned 1,8-dihydroxy-naphthalene-3,6-disulphonic acid (chromotropic acid), the strongly electron withdrawing sulphonic acid group(s) presumably inhibiting the formation of an effective build-up suppressant coating product according to the invention by deactivation of the aromatic ring.

Of the effective 1-naphthols which may be used to form (with formaldehyde) a build-up suppressant coating product according to the invention, 1-naphthol itself is by far the most preferred on account of its cheapness, ready commercial availability, and the exceptional effectiveness of the coating product made therefrom as a build-up suppressant which effectiveness does not noticeably deteriorate when the product is stored (e.g. as an alkaline solution—which is deep blue in colour) for long periods of time, provided (as mentioned before) only limited access to oxygen is allowed to prevent the formation of harmful oxidation products.

It is found that 2-naphthols (unless they also contain a nuclear hydroxyl group in the 5 or 8 position, in which case they can alternatively be considered as 1-naphthols) cannot be used to form to a coating product according to the present invention, since they will not yield condensates with formaldehyde which possess build-up suppressant activity. For example, 2-naphthol itself, or 2,3-dihydroxy-naphthalene, with formaldehyde both yield white products which are insoluble in aqueous alkalis; when dissolved in an organic solvent and applied to the reactor internal surfaces, the build-up suppressant activity of each product is mediocre.

The build-up suppressant coating product of the invention has been found to be outstandingly effective in the process of the present invention both in respect of vinyl chloride homopolymerisations and vinyl chloride copolymerisations, particularly vinyl chloride/vinyl acetate copolymerisations which are particularly difficult to operate consistently free from build-up. Thus its beneficial action regarding build-up suppression has been found to be remarkably reproducibly effective over lengthy sequences of trial polymerisations on a plant-scale, each sequence of polymerisations being carried out successively in the same reactor with the coating product being reapplied before each polymerisation and without the reactor surfaces being cleaned before each polymerisation (the surfaces merely being gently rinsed down with water to remove any of the normal polymer that may have remained in the reactor). Moreover in one sequence of trial plant-scale polymerisations, "closed lid" conditions were successfully operated for some 20 consecutive polymerisations, the build-up suppressant coating being applied by spraying a basic aqueous solution of the coating product from equipment mounted inside the reactor without the reactor being opened between polymerisations. Additionally, in many polymerisation recipes, it is found that at least three and sometimes four consecutive polymerisations may be carried out in the same reactor without interbatch cleaning or the need to recoat the reactor after the first polymerisation. However it is currently more usual, particularly when operating on a plant scale, to apply the build-up suppressant coating before each polymerisation to make sure that the entire sequence of polymerisations is free from build-up formation. Nevertheless the significant effectiveness of the present invention may well render this precaution unnecessary in many cases.

The build-up suppressant coating of the invention is yet further remarkable in that it will prevent build-up formation on reactor surfaces which are of very dubious quality, being e.g. heavily scored or rough from extensive previous use. Moreover, if applied to a dubious surface from which it has not been possible to remove some extremely tenacious build-up from past polymerisations (not according to the invention), this build-up does in fact become detachable after a few polymerisations in the coated reactor.

The coating product used in the process of the invention may readily be formed by the condensation of an effective 1-naphthol and formaldehyde. This is the only method we have thus far investigated for preparing the build-up suppressant products, although we believe it may also be possible to form such products using other methods, e.g. by the acid-catalysed self-condensation of compounds such as 2-methylol-1-naphthol and 4-methylol-1-naphthol alone or in combination. In respect of this possibility, the significance of the work "formable" in claim 1 as against the work "formed" in claim 2 should be noted.

When employing the condensation of an effective 1-naphthol and formaldehyde to form a coating product for use in the process of the invention, it is believed that the effective 1-naphthol and formaldehyde react together in substantially equimolar quantities in order to form the product, with (it has been shown) any molar excess of 1-naphthol used remaining unreacted and (it is postulated) any molar excess of formaldehyde used reacting further with the coating product thereby lowering its yield. Accordingly, as far as the formation of the actual coating product is concerned, the ratio of the quantities of effective 1-naphthol and formaldehyde which are admixed for the condensation is not believed to be particularly critical since an equimolar reaction is considered to occur. However, when a significant excess over equimolar of one or other reactant is used, the coating product may, for the purposes of some polymerisation recipes, be associated with an undesirable quantity of a contaminant (in that a deleterious effect may be incurred), and it may sometimes (according to the condensation method used to prepare the coating product) be uneconomic or difficult to remove enough of the contaminant to avoid the deleterious effect (although in principle it could be done). Thus, if one departs from the admixture of substantially equimolar quantities of effective 1-naphthol and formaldehyde for the condensation, particularly if the coating product is made by a base-catalysed reaction and is not isolated, being applied as the direct or diluted alkaline solution from the condensation reaction, then the vinyl chloride polymerisation itself may sometimes be deleteriously affected particularly if a dialkyl peroxydicarbonate is employed as the polymerisation initiator (polymerisations which use other initiators, e.g. lauroyl peroxide and azo compounds, are found to be much less sensitive to the 1-naphthol/formaldehyde ratio); either the polymerisation reaction may be retarded which happens when the effective 1-naphthol is used in a substantial excess over equimolar, or the build-up suppressant coating may fail to completely or consistently prevent the formation of build-up, which happens when the formaldehyde is used in a substantial excess over equimolar. Generally speaking in such cases, the admixture controlled to only allow a temperature rise of from 70° C. to 80° C. No external heating was required during the addition (exothermic). When all the formaldehyde solution had been added (and after optionally stirring for a further period) the contents of the reaction vessel were heated to reflux at 98° C. and refluxed for 30 minutes. The resulting alkaline solution of the coating product (deep blue in colour), having an estimated product concentration of about 20% w/v, was used, either neat or diluted, to form build-up suppressant coatings according to the invention. (N.B. Whether neat or diluted, the alkaline solutions had a pH of about 13).

For large scale preparations (x>20) about 0.9×ml of a 20% aqueous surfactant solution was added to the solution obtained from cooling; also filtration to remove a small quantity of precipitate was sometimes necessary for such preparations.

A typical preparation, on a 25 molar scale (i.e. x=y=25), is now described.

1-Naphthol (3600 g, 25 mole) and 18.0 liter of a 1 molar aqueous NaOH solution (i.e. containing 18 mole of NaOH) were placed in a flask (fitted with a reflux condenser, thermometer and stirrer) and heated to 70° C. with efficient stirring. Formaldehyde (1975 ml of a 38% w/v aqueous solution, 25 mole) was added dropwise over 1.5 hours, ensuring that the temperature of the flask contents did not rise above 80° C. The mixture was then stirred for about 3 hours, during which time the temperature dropped to 60° C. The stirred mixture was then heated to boiling (approximately 98° C.) and allowed to reflux for 0.5 hours. On cooling, 20 ml of a 20% aqueous solution of a surfactant were added and stirred into the mixture. The product was a mobile deep-blue alkaline solution (pH about 13) of the 1-naphthol/formaldehyde condensate having an estimated product concentration of 20% w/v.

EXAMPLE 2

The internal surfaces, made of stainless steel, of a polymerisation reactor (capacity about 35 liters) were painted with about 15 ml of an aqueous alkaline solution, the solution being derived by dilution of neat alkaline condensate solution from Example 1 (prepared on a 0.25 molar scale, i.e. x=y=0.25) with an equal volume of water. The internal surfaces thereby became coated with the 1-naphthol/formaldehyde condensate. The polymerisation employed 100 parts of vinyl chloride, 213 parts of water, partially hydrolysed polyvinyl acetate as suspension agent (0.24% based on the weight of vinyl chloride) and, as initiator, diethyl peroxydicarbonate (0.09% based on the weight of vinyl chloride). The polymerisation temperature was 57° C.

The polymerisation was terminated when the pressure had dropped to about half that of the running pressure by venting and discharging the polymer slurry. Inspection of the reactor internal surfaces showed that they were completely free from any build-up.

EXAMPLE 3

The homopolymerisation of Example 2 was repeated in the same reactor except that the internal surfaces were not coated with build-up suppressant at all.

Heavy build-up was observed.

EXAMPLE 4

The internal surfaces, made of stainless steel, of a polymerisation reactor (capacity about 35 liters) were painted with about 15 ml of an aqueous alkaline solution, the solution being derived by dilution of neat alkaline condensate solution from Example 1 (prepared on a 0.25 molar scale, i.e. x=y=0.25) with an equal volume of water. The reactor internal surfaces thereby become coated with the 1-naphthol/formaldehyde condensate.

A vinyl chloride/vinyl acetate copolymerisation was carried out in the coated reactor. The copolymerisation employed 100 parts vinyl chloride, 11 parts vinyl acetate, 207 parts water, partially hydrolysed polyvinyl acetate as suspension agent (0.33% based on the weight of vinyl chloride) and, as initiator, diethyl peroxydicarbonate (0.07% based on the weight of vinyl chloride). The polymerisation temperature was 58° C.

The polymerisation was terminated when the pressure had dropped to about half that of the running pressure by venting and discharging the polymer slurry. Inspection of the reactor internal surfaces showed that they were completely free from any build-up.

EXAMPLE 5

The procedure of Example 4 was carried out except that the aqueous alkaline solution applied was derived by diluting neat alkaline condensate solution from Example 1 (prepared on a 0.25 molar scale, i.e. x=y=0.25) with about ⅓ its volume of water.

No build-up formation was observed.

EXAMPLE 6

The procedure of Example 4 was repeated except that the aqueous alkaline solution applied was neat alkaline condensate solution from Example 1 (prepared on a 25 molar scale, i.e. x=y=25).

No build-up formation was observed.

EXAMPLE 7 AND 8

The copolymerisation of Example 6 was repeated in Examples 7 and 8 using the same reactor but without renewing the build-up suppressant coating applied in Example 6 before each polymerisation or cleaning the reactor before each polymerisation (merely rinsing down with water).

In each case no build-up formation was observed.

EXAMPLE 9

The procedure of Example 4 was repeated except that the reactor employed had a capacity of about 5 liters, 10 ml of the alkaline aqueous solution were applied, and the copolymerisation employed 100 parts vinyl chloride, 20.5 parts vinyl acetate, 223 parts water, partially hydrolysed polyvinyl acetate as suspension agent (0.48% based on the weight of vinyl chloride) and, as initiator, lauroyl peroxide (0.15% based on the weight of vinyl chloride). The polymerisation temperature was 80° C.

No build-up formation was observed.

EXAMPLE 10

The copolymerisation of Example 4 was repeated in the same reactor except that the internal surfaces were not coated with build-up suppressant at all.

Heavy build-up was observed.

EXAMPLE 11 AND 12

Alkaline condensate solutions were prepared using substantially the recipe of Example 1, but in place of 1-naphthol itself the following substituted 1-naphthols were employed:

Example 11: 1,3-dihydroxy-naphthalene; scale 0.025 molar; colour of condensate solution deep red Example 12: 1,7-dihydroxy-naphthalene; scale 0.25 molar; colour of condensate solution deep green.

EXAMPLE 13

The same procedure of Example 1 was followed initially (on a 0.25 molar scale) but in place of 1-naphthol itself there was used 1,5-dihydroxy-naphthalene. However after the reflux period a black precipitate had formed—this being insoluble in the aqueous NaOH solution. This condensate product was, however, soluble in organic solvents such as acetone.

EXAMPLES 14 TO 16

The procedure of Example 4 was adopted except that the reactor internal surfaces were coated with the neat condensate solutions (about 15 ml being used) from Example 11 (in Example 14), and Example 12 (in Example 15). In Example 16, about 15 ml of a 20% w/v acetone solution of the coating product from Example 13 was used to coat the reactor internal surfaces.

No build-up formation was observed on the coated reactor surfaces.

EXAMPLE 17 (COMPARATIVE)

The procedure of Example 1 was repeated (on the 25 molar scale, i.e. $x=y=25$), except that 2-naphthol was used in place of 1-naphthol. Instead of a deep blue alkaline solution being obtained, a solid resinous white mass ensued which could not be removed without breaking the flask. The liquor in the flask was removed and the flask charged with acetone. The mixture was stirred for several hours until the material dissolved.

EXAMPLE 18 (COMPARATIVE)

The procedure of Example 4 was repeated except that the internal surfaces were coated by applying about 15 ml of an approximately 20% w/v acetone solution of the 2-naphthol/formaldehyde condensate of Example 17.

Significant build-up was observed.

EXAMPLE 19 (COMPARATIVE)

The procedure of Example 1 was repeated (on the 0.25 molar scale, i.e. $x=y=0.25$) except that 2,3-dihydroxy-naphthalene was used in place of 1-naphthol. Instead of a deeply coloured solution being obtained, a white precipitate formed. This was filtered off; it was found to be soluble in acetone.

EXAMPLE 20 (COMPARATIVE)

The procedure of Example 4 was repeated, except that the reactor internal surfaces were coated by applying 15 ml of a 20% w/v acetone solution of the 2,3-dihydroxy-naphthalene/formaldehyde condensate of Example 19.

Significant build-up formation was observed.

EXAMPLE 21 (COMPARATIVE)

The procedure of Example 1 was repeated (on the 0.1 molar scale, i.e. $x=y=0.1$), except that 1,8-dihydroxy-naphthalene-3,6-disulphonic acid was used in place of 1-naphthol. A brown alkaline solution was obtained.

EXAMPLE 22 (COMPARATIVE)

The procedure of Example 4 was repeated except the reactor internal surfaces were coated with about 15 ml of the neat alkaline solution of Example 21.

Significant build-up formation was observed.

EXAMPLE 23

A coating product for use in the preparation of a build-up suppressant coating according to the invention was produced using an acid-catalysed reaction as follows. 1-Naphthol (36 g, 0.25 mole) was stirred in 180 ml of 1 molar aqueous HCl solution at 70° C. Formaldehyde (19.75 ml of a 38% w/v aqueous solution, 0.25 mole) was added and the stirred mixture heated to reflux. After a few minutes, a hard red/brown lump was formed. This material was removed, washed clean of acid, dried and crushed to a fine powder. The powder was dissolved in 180 ml of a 1 molar aqueous NaOH solution to give a deep blue alkaline solution, very similar to that from Example 1, having an estimated product concentration of 20% w/v.

EXAMPLE 24

The procedure of Example 4 was repeated, except that the reactor internal surfaces were coated by applying about 15 ml of the alkaline solution from Example 23.

No build-up formation was observed.

EXAMPLE 25

The procedure of Example 2 was repeated except that the reactor employed had a capacity of about 160 liters, the reactor was sprayed with 20 ml of an aqueous alkaline solution derived by dilution of neat alkaline condensate solution from Example 1 (prepared on a 25 molar scale, i.e. $x=y=25$) with $\frac{1}{2}$ its volume of water, and the homopolymerisation employed 100 parts vinyl chloride, 120 parts water, partially hydrolysed polyvinyl acetate as suspension agent (0.09% based on the weight of vinyl chloride) and, as initiator, bis (4-tertiarylbutylcyclohexyl) peroxydicarbonate (0.1% based on the weight of vinyl chloride). The polymerisation temperature was 57° C.

No build-up formation was observed.

EXAMPLE 26

The homopolymerisation of Example 25 was carried out in the same reactor except that the internal surfaces were not coated with build-up suppressant at all.

Significant build-up was observed.

EXAMPLE 27

The procedure of Example 1 was substantially followed for the preparation of a coating product according to the invention (derived from 1-naphthol and formaldehyde) on a very large scale suitable for use in plate-scale trials (described in Example 28), the trials being for the purpose of testing the suitability of the product for use as a build-up suppressant in routine plant-scale production. The scale employed for the product preparation was $1.11 \times 10^3$ molar, i.e. $x = 1.11 \times 10^3$ and $y = 1.12 \times 10^3$. (20% surfactant solution was not added.)

EXAMPLE 28

Plant-scale trials were carried out using a polymerisation reactor of capacity 40 m$^3$ and a recipe to produce vinyl chloride homopolymer. The internal surfaces of the reactor (made of stainless steel) were sprayed with 0.5 liter of an aqueous alkaline solution, the solution being derived by diluting some of the neat alkaline condensate solution made according to Example 33 with 3 times its volume of a 2% w/v aqueous solution of a partially hydrolysed polyvinyl acetate.

It was found that lengthy sequences of consecutive polymerisations (of at least 30) could be carried out in the reactor without the formation of build-up (the reactor surfaces not being cleaned before each polymerisation—merely being rinsed down with water, and the coating being reapplied before each polymerisation). (N.B. the length of a trial sequence without cleaning was cut short by factors other than build-up formation, e.g. the requirement of the reactor for making another grade of polymer, or the need to perform maintenance work on it.) Moreover, in the most recent trial it was shown that at least 4 consecutive polymerisations could be carried out in the reactor without the need to reapply the coating after the first polymerisation (no build-up being formed). Also, in a similar plant-trial carried out in a reactor of capacity 13.6 m$^3$, 20 of the consecutive polymerisations were performed under "closed lid" conditions in order to prove the possibility of such operation.

The results of the plant trials described in Example 28 demonstrate the remarkable reproducible effectiveness of the build-up suppressant coating of the invention. The results are even more noteworthy in view of the fact that the internal surfaces of the 40 m$^3$ reactor used were of poor quality (being very rough and heavily scored) and that the use of another build-up suppressant coating product (not according to the invention), considered to be of generally excellent efficacy and employed in some other reactors with reasonable success, with this reactor necessitated very frequent high-pressure cleaning due to build-up formation, often after each polymerisation.

We claim:

1. A process for the polymerisation of vinyl chloride in aqueous suspension wherein the polymerisation is carried out in a polymerisation reactor having adherently deposited on internal surfaces thereof a build-up suppressant coating comprising a product having build-up suppressant activity which is formed by the condensation of formaldehyde and an effective 1-naphthol of formula

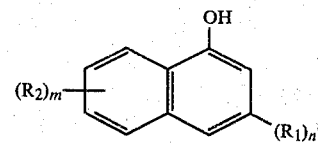

wherein n is 0 or 1; m is 0, 1, 2 or 3; and $R_1$ and $R_2$ which may be the same or different are selected from Cl, lower alkyl (1–5 carbon atoms), hydroxyl, and lower alkoxyl (1–5 carbon atoms).

2. A process according to claim 1 wherein in said effective 1-naphthol m is 0, 1 or 2.

3. A process according to claim 1 wherein the condensation is effected in a base-catalysed reaction.

4. A process according to claim 1 wherein the condensation is effected in an acid-catalysed reaction.

5. A process according to claim 1 wherein said an effective 1-naphthol is 1-naphthol itself.

6. A process according to claim 1 wherein said an effective 1-naphthol is selected from 1,3-dihydroxy-naphthalene, 1,5-dihydroxy-naphthalene, and 1,7-dihydroxy-naphthalene.

7. A process according to claim 1 wherein the coating is formed by the application to the reactor internal surfaces of an alkaline aqueous solution (where preparable) comprising the product having build-up suppressant activity.

8. A process according to claim 7 wherein said alkaline aqueous solution is the direct or diluted solution obtained from the condensation in a base-catalysed reaction.

9. A process according to claim 1 wherein the molar admixture ratio for the condensation of said an effective 1-naphthol/formaldehyde is within the range 1.1/1.0 to 1.0/1.2.

10. A process according to claim 9 wherein said molar admixture ratio is substantially 1.0/1.0.

* * * * *